United States Patent
Tran et al.

(10) Patent No.: US 11,562,139 B2
(45) Date of Patent: Jan. 24, 2023

(54) TEXT DATA PROTECTION AGAINST AUTOMATED ANALYSIS

(71) Applicant: INTERNATIONAL BUSINESS MACHINES CORPORATION, Armonk, NY (US)

(72) Inventors: Ngoc Minh Tran, Dublin (IE); Killian Levacher, Dublin (IE); Beat Buesser, Ashtown (IE); Mathieu Sinn, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 17/101,465

(22) Filed: Nov. 23, 2020

(65) Prior Publication Data
US 2022/0164532 A1 May 26, 2022

(51) Int. Cl.
| | |
|---|---|
| G06F 40/00 | (2020.01) |
| G06F 40/253 | (2020.01) |
| G06N 20/00 | (2019.01) |
| G06F 40/30 | (2020.01) |
| G06F 40/194 | (2020.01) |
| G06F 40/169 | (2020.01) |

(52) U.S. Cl.
CPC .......... *G06F 40/253* (2020.01); *G06F 40/169* (2020.01); *G06F 40/194* (2020.01); *G06F 40/30* (2020.01); *G06N 20/00* (2019.01)

(58) Field of Classification Search
CPC ....................................................... G06F 40/30
See application file for complete search history.

(56) References Cited

U.S. PATENT DOCUMENTS

| | | | |
|---|---|---|---|
| 7,231,341 B2 | 6/2007 | Bangalore | |
| 8,019,610 B2 | 9/2011 | Walker | |
| 9,703,962 B2 | 7/2017 | Salajegheh | |
| 9,881,010 B1 * | 1/2018 | Gubin | G06F 40/279 |

(Continued)

OTHER PUBLICATIONS

Bayraktar et al, "On the Adversarial Robustness of Multivariate Robust Estimation." arXiv:1903.11220v1 [stat.ML] Mar. 27, 2019, 33 pages.

(Continued)

*Primary Examiner* — Scott T Baderman
*Assistant Examiner* — Barbara M Level
(74) *Attorney, Agent, or Firm* — Rakesh Roy

(57) ABSTRACT

A method, computer system, and a computer program product for text data protection is provided. The present invention may include receiving a text data. The present invention may also include identifying a portion of the received text data having a highest impact on a first confidence score associated with a target model prediction. The present invention may further include generating at least one semantically equivalent text relative to the identified portion of the received text data. The present invention may also include determining that the generated at least one semantically equivalent text produces a second confidence score associated with the target model prediction that is less than the first confidence score associated with the target model prediction. The present invention may further include generating a prompt to suggest modifying the identified portion of the received text data using the generated at least one semantically equivalent text.

20 Claims, 6 Drawing Sheets

(56) References Cited

U.S. PATENT DOCUMENTS

| | | | |
|---|---|---|---|
| 10,956,670 B2* | 3/2021 | Wroczynski | G06F 40/216 |
| 2017/0249479 A1* | 8/2017 | Gordon | G06F 40/166 |
| 2019/0171950 A1 | 6/2019 | Srivastava | |
| 2020/0201993 A1 | 6/2020 | Anders | |
| 2021/0124999 A1* | 4/2021 | Dia | G06N 3/08 |
| 2021/0326751 A1* | 10/2021 | Liu | G06N 3/084 |
| 2021/0342546 A1* | 11/2021 | Beigi | G06K 9/6235 |
| 2021/0397793 A1* | 12/2021 | Li | G06N 20/00 |
| 2022/0198135 A1* | 6/2022 | Peleg | G06F 40/30 |

OTHER PUBLICATIONS

Behjati et al., "Universal Adversarial Attacks on Text Classifiers", IEEE, 2019, ICASSP 2019, 978-1-5386-4658-8/18, pp. 7345-7349.

Cohen et al., "Certified Adversarial Robustness via Randomized Smoothing." Proceedings of the 36 th International Conference on Machine Learning, arXiv:1902.02918v2 [cs.LG] Jun. 15, 2019, 36 pages.

Dasgupta et al., "Gray-box Techniques for Adversarial Text Generation", 2018, CEUR-WS.org/Vol-2269/FSS-18_paper_52.pdf, 7 pages.

Ebrahimi et al., "HotFlip: White-Box Adversarial Examples for Text Classification", ACL, arXiv:1712.06751v2 [cs.CL] May 24, 2018, 6 pages.

Jin et al., "TextFool: Fool your Model with Natural Adversarial Text," 2019, [accessed Oct. 2, 2020], 10 pages, Retrieved from the Internet: <http://groups.csail.mit.edu/medg/ftp/psz-papers/2019%20Di%20Jin.pdf>.

Li et al., "TextBugger: Generating Adversarial Text Against Real-world Applications," arXiv:1812.05271v1 [cs CR] Dec. 13, 2018, 15 pages.

Liu et al. "Adversarial Training for Large Neural Language Models." arXiv:2004.08994v2 [cs.CL] Apr. 29, 2020, 13 pages.

Mell et al., "The NIST Definition of Cloud Computing", National Institute of Standards and Technology, Special Publication 800-145, Sep. 2011, 7 pages.

Michel et al. "On Evaluation of Adversarial Perturbations for Sequence-to-Sequence Models." arXiv:1903.06620v2 [cs.CL] Mar. 19, 2019, 12 pages.

Wang et al., "Towards a Robust Deep Neural Network in Texts: A Survey", arXiv:1902.07285v5 [cs.CL] Jan. 3, 2020, 19 pages.

Zhang et al. "Generating Fluent Adversarial Examples for Natural Languages." arXiv:2007.06174v1 [cs.CL] Jul. 13, 2020, 6 pages.

Zhang et al. "Interpreting and Improving Adversarial Robustness of Deep Neural Networks with Neuron Sensitivity." arXiv:1909.06978v2 [cs.CV] Nov. 19, 2019, 32 pages.

\* cited by examiner

TEXT DATA PROTECTION AGAINST AUTOMATED ANALYSIS

BACKGROUND

The present invention relates generally to the field of computing, and more particularly to data protection.

Digital text documents (e.g., electronic mail (e-mail), word document) are extensively used for communication, collaboration, and ideation. In parallel, recent developments within the field of machine learning, and more specifically, natural language processing (NLP) have enabled large scale automated text analysis using Artificial Intelligence (AI) to perform classification or information extraction (e.g., analysis of intents, named-entity recognition). If digital text documents are transmitted through non-secure channels (e.g., Internet), the contents of these documents—which may contain personal or sensitive information—may be potentially exposed to automated text analysis by unauthorized third-party institutions.

SUMMARY

Embodiments of the present invention disclose a method, computer system, and a computer program product for text data protection. The present invention may include receiving a text data. The present invention may also include identifying a portion of the received text data having a highest impact on a first confidence score associated with a target model prediction. The present invention may further include generating at least one semantically equivalent text relative to the identified portion of the received text data. The present invention may also include determining that the generated at least one semantically equivalent text produces a second confidence score associated with the target model prediction that is less than the first confidence score associated with the target model prediction. The present invention may further include generating a prompt to suggest modifying the identified portion of the received text data using the generated at least one semantically equivalent text.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
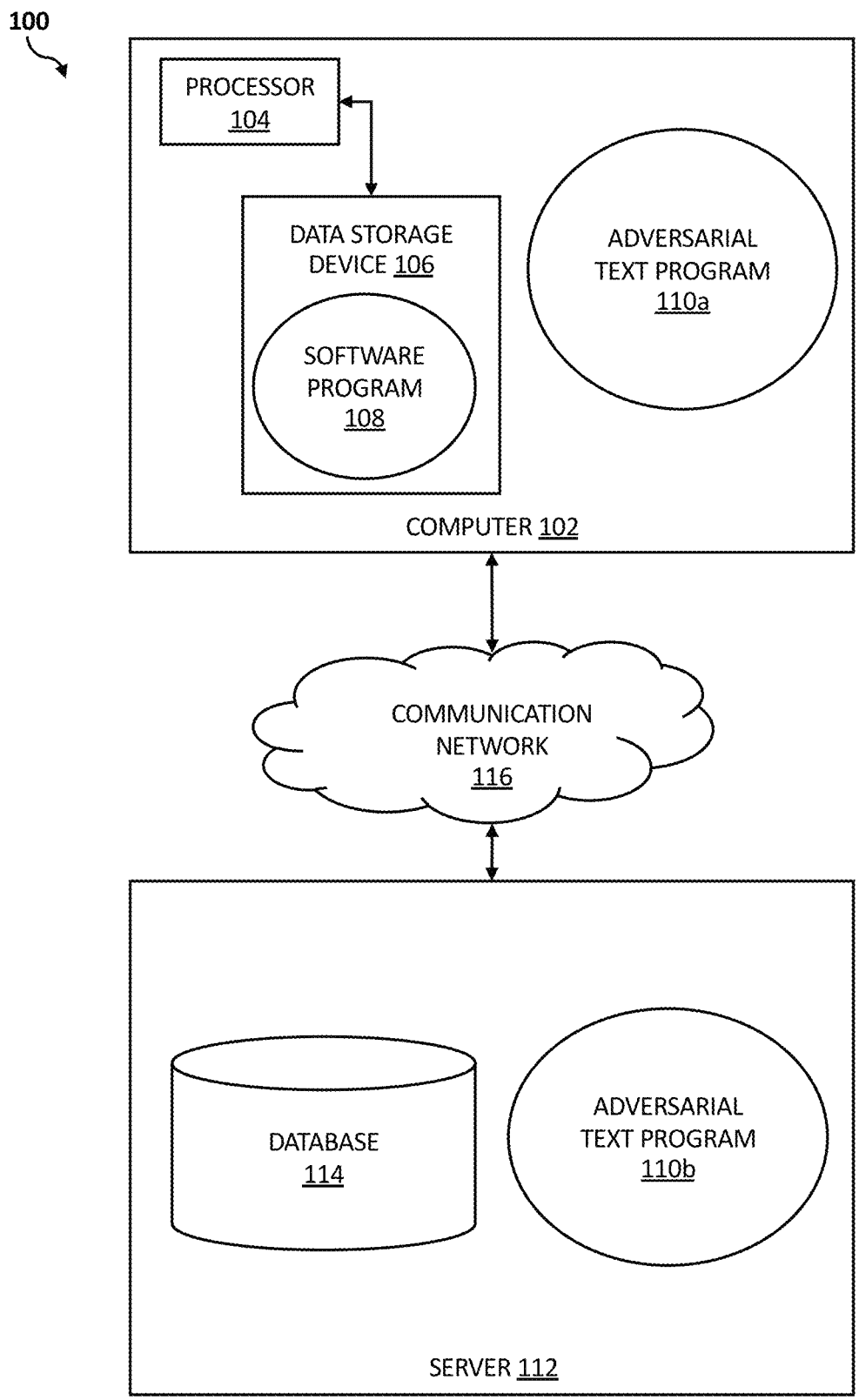
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for adversarial robustness of text data. As such, the present embodiment has the capacity to improve the technical field of data protection by creating, applying, and evaluating adversarial patches for text documents to provide protection against automated analysis of these documents using AI. More specifically, an adversarial text program may receive text data in a text editor from a user device. Then, the adversarial text program may identify a portion of the received text data which may have a highest impact on a first confidence score associated with a prediction of a target machine learning (ML) model. Next, the adversarial text program may generate at least one semantically equivalent text relative to the identified portion of the received text data. Then, the adversarial text program may make a determination that the generated at least one semantically equivalent text produces a second confidence score associated with the prediction of the target ML model that is less than the first confidence score associated with the prediction of the target ML model. Thereafter, the adversarial text program may generate a suggestion prompt in the text editor to modify the identified portion of the received text data using the generated at least one semantically equivalent text.

As described previously, digital text documents are extensively used for communication, collaboration, and ideation. In parallel, recent developments within the field of machine learning, and more specifically, NLP have enabled large scale automated text analysis using AI to perform classification or information extraction (e.g., analysis of intents, named-entity recognition). If digital text documents are transmitted through non-secure channels (e.g., Internet), the contents of these documents—which may contain personal or sensitive information—may be potentially exposed to automated text analysis by unauthorized third-party institutions.

Existing techniques for adversarial robustness of text documents provide no guarantee that the semantic meaning of the original document is preserved. Additionally, no existing mechanisms enable an author of a document to determine whether or not the document is vulnerable to automated analysis attacks.

Therefore, it may be advantageous to, among other things, provide a way to adapt the contents of a text document to prevent or obstruct malicious users from applying automated text analytics, by modifying the text document with adversarial text parts that preserve the original semantic meaning of the text document but fool AI models implementing NLP tasks, such as, text classification and information extraction.

According to at least one embodiment, an adversarial text program may implement a library module for storing built-in and customized adversarial text attacks, an adversarial robustness scoring module for evaluating text data for text robustness, and a module for suggesting semantically equivalent text segments or portions of a document.

According to one embodiment, a "portion of a document" or a "portion of a text data" may include characters/letters, words, phrases, sentences, paragraphs, or sections contained within a text document. According to one embodiment, "semantically equivalent text" may refer to a replacement for a portion of a text document which preserves—when inserted in the same position in the original text document— the semantic meaning of the original text.

According to one embodiment, "text robustness" may refer to the ability of text data to withstand automated analysis using AI for NLP tasks, such as, text classification. In one embodiment, a "text robustness score" for a portion of text data may be determined by calculating how much modifying (e.g., deleting) that portion of text data would alter a confidence score of a prediction made by a target ML model before and after the modification.

According to at least one embodiment, the adversarial text program may receive all or some of the following inputs: a digital text document written or in the process of being written and an author's approval/rejection of suggested text edits. According to at least one embodiment, the adversarial text program may return all or some of the following outputs: a vulnerability score associated with the input text document, a semantically equivalent and robust text edit suggestions, and an adversarial robust version of the original text document with author approved text edits applied to the original text document.

According to at least one embodiment, the adversarial text program may implement an adversarial text attacks/ML model library module, a document/portion of document vulnerability score module, a semantically equivalent word/ phrases generation module, and a text auto-suggestion module.

According to at least one embodiment, the library module may be implemented to store one or more built-in ML models (e.g., classifiers) and adversarial text attacks. In some embodiments, the library module may be implemented to enable users to add their own ML models and adversarial text attacks. In one embodiment, the scoring module may implement a strategy which uses the library module to score portions of the text document. Upon receiving the text document, the scoring module may produce a score (e.g., robustness score/importance score) for every portion of the text document (or only at certain granularities as specified by the user). In at least one embodiment, the score may measure how much modifying a certain portion of the text document would alter the text document's robustness against an NLP task. In one embodiment, the scoring module may use weighted average scores returned by all or a number of the adversarial attacks. Once the scores are calculated, the scoring module may pass the scores to the suggestion module. In one embodiment, upon receiving a text document and its respective scores from the scoring module, the suggestion module may implement a strategy that uses the library module to evaluate and rank the most efficient approaches to make the text document more robust against automated AI analysis. According to one embodiment, the suggestion module may implement various modification strategies to create a text document that is more robust against automated AI analysis. Modifications may include, but is not limited to, deletion, insertion, replacement, and/or swapping of letters, words, phrases, and/or sentences. In one embodiment, the suggestion module may implement functions such as, word embeddings or knowledge graphs to map a text to its numerical representation. These functions have a designed property such that, if two texts are close in meaning, the respective numerical representations are also close in value (e.g., words represented by 3.5 and 4.5, respectively, may be closer in meaning than words represented by 3.5 and 5.5, respectively). In one embodiment, the suggestion module may use word embeddings to map an original text (e.g., word) to a replacement text (e.g., replacement word) in the embedding space of the original text such that the semantic equivalence is maintained in the text. Alternatively, the suggestion module may use knowledge graphs to select the most meaningful word/phrase for replacing the original text, while maintaining the semantic equivalence of the text. In at least one embodiment, the suggestion module may recommend no modifications, if none is necessary to enhance text robustness against automated AI analysis.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an adversarial text program 110a. The networked computer environment 100 may also include a server 112 that is enabled to run an adversarial text program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the adversarial text program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the adversarial text program 110a, 110b (respectively) to measure a text robustness of a text input and create, apply, and evaluate adversarial text patches for the text input to protect the text input against automated AI analysis. The adversarial text system and method are explained in more detail below with respect to FIGS. 2 and 3.

Figure 2:
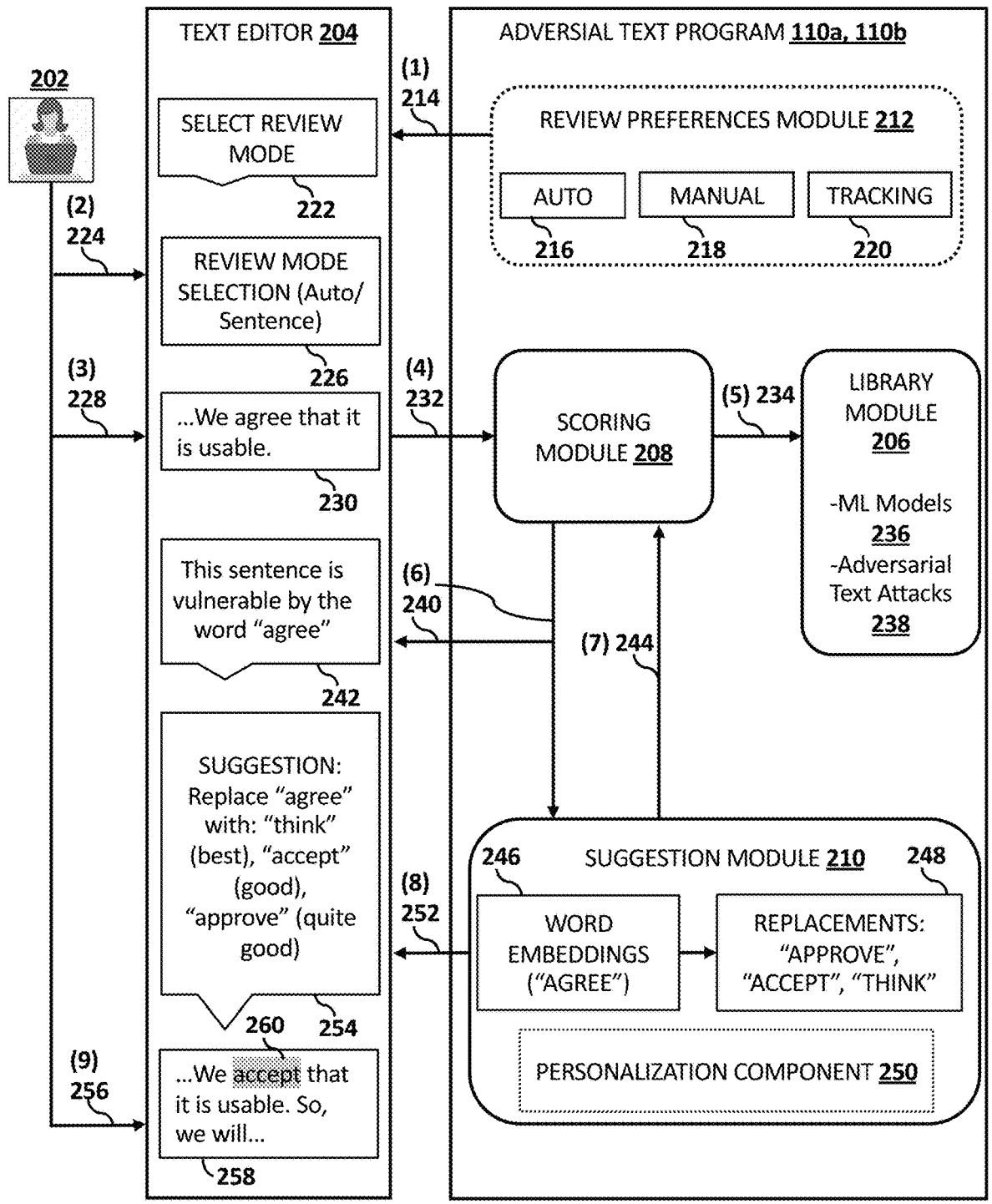
FIG. 2 is a schematic block diagram of a text data protection environment according to at least one embodiment.

Referring now to FIG. 2, a schematic block diagram of a text data protection environment 200 implementing the content protection program 110a, 110b according to at least one embodiment is depicted. According to one embodiment, the text data protection environment 200 may include one or more components (e.g., client computer 102; server computer 112; communication network 116) of the computer environment 100 discussed above with reference to FIG. 1.

According to one embodiment, the text data protection environment 200 may include a user 202 interacting (e.g., via user device) with a text editor 204 implementing the adversarial text program 110a, 110b. In one embodiment, the user device (of user 202), text editor 204, and the adversarial text program 110a, 110b may include respective computer systems linked to a communication network (e.g., communication network 116). In various embodiments, the computer systems associated with the user 202, the text editor 204, and the adversarial text program 110a, 110b may include a workstation, a personal computing device, a laptop computer, a desktop computer, a thin-client terminal, a tablet computer, a smart telephone, a smart watch or other smart wearable, or other electronic devices.

According to one embodiment, the adversarial text program 110a, 110b may be stored in a tangible storage device of the associated computer system and executed using a processor the associated computer system. In one embodiment, the adversarial text program 110a, 110b may include a single computer program or multiple program modules or sets of instructions being executed by the processor of the associated computer system. The adversarial text program 110a, 110b may include routines, objects, components, units, logic, data structures, and actions that may perform particular tasks or implement particular abstract data types. The adversarial text program 110a, 110b may be practiced in distributed cloud computing environments where tasks may be performed by remote processing devices which may be linked through the communication network. In one embodiment, the adversarial text program 110a, 110b may include program instructions that may be collectively stored on one or more computer-readable storage media.

According to at least one embodiment, the adversarial text program 110a, 110b may enable the user 202 to modify the contents of a text document with one or more adversarial text parts that preserve the original semantic meaning of the text document but prevent or obstruct malicious users from applying automated, AI-based text analytics to the text document. In one embodiment, the adversarial text parts may include a goal of reducing a confidence score of a correct prediction made by a target ML model and/or increasing a confidence score of an incorrect prediction made by the target ML model.

In at least one embodiment, the adversarial text program 110a, 110b may include a library module 206, a scoring module 208, and a suggestion module 210, as will be discussed below in further detail. In some embodiments, the adversarial text program 110a, 110b may also include a review preferences module 212, as will be discussed below in further detail. Each of the modules may be performed by a single computer system or performed by separate computer systems which may be linked through the communication network.

According to one embodiment, the text editor 204 may be integrated with the adversarial text program 110a, 110b (e.g., via application programming interface (API)), as previously described. As such, the text editor 204 may be implemented as an interface between user 202 and the adversarial text program 110a, 110b. More specifically, inputs received by the adversarial text program 110a, 110b may be provided by the user 202 (e.g., via user device) interacting with the text editor 204 as a digital text document written or in the process of being written. Further, outputs (e.g., prompts, edit approval requests) generated by the adversarial text program 110a, 110b may be provided to the user 202 (e.g., user device) via the text editor 204.

Upon initialization of the text editor 204 by the user 202 (e.g., to draft a text document), the review preferences module 212 of the adversarial text program 110a, 110b may be implemented to prompt the user 202 to select a review mode, at event (1) 214. In one embodiment, the review preferences module 212 may include an automatic mode 216, a manual mode 218, and a tracking mode 220. In one embodiment, at event (1) 214, the adversarial text program 110a, 110b may transmit a review mode selection prompt 222 to the user 202 via the text editor 204 (e.g., implement the text editor 204 to generate the review mode selection prompt 222).

In embodiments where the automatic mode 216 is selected by the user 202, modules (e.g., library module 206, scoring module 208, suggestion module 210) of the adversarial text program 110a, 110b may run in the background with different levels of interaction (e.g., based on user 202 selection) while the user 202 is typing. In one embodiment, the automatic mode 216 may include an automatic phrase-level interaction (e.g., when users finish typing a phrase, the system may automatically operate on that phrase), an automatic sentence-level interaction (e.g., when users finish typing a sentence, the system may automatically operate on that sentence), an automatic paragraph-level interaction (e.g., when users finish typing a paragraph, the system may automatically operate on that paragraph), an automatic document-level interaction (e.g., when users finish typing a document, the system may automatically operate on that document), an automatic randomized interaction (e.g., the system may select a random subset of the text to automatically operate on), and an automatic attached document interaction (e.g., in the case of e-mails or chats, where files may be attached, the system may automatically scan and evaluate the robustness of the attached documents). In embodiments where the manual mode 218 is selected, user 202 may be enabled to manually select an arbitrary portion of a text document or a number of text documents to check the robustness thereof and obtain suggestions from the system for improving the adversarial text robustness. In embodiments where the tracking mode is selected, the adversarial text program 110a, 110b may enable existing archived text documents to be modified with adversarial text suggestions. In this embodiment, each proposed modification may be tracked in the original text document and the user 202 may be enabled to either accept or reject the proposed changes.

At event (2) 224, the user 202 may indicate a review mode selection 226 via the text editor 204. For example, the user 202 may select the automatic mode 216 review with sentence-level interaction.

At event (3) 228, the user 202 may compose a digital text document, which may be received as an input text data 230 by the text editor 204, and therefore, the adversarial text program 110a, 110b. In one embodiment, the text data 230 may include a digital text document that is written or in the process of being written (e.g., in real-time) by the user 202. In at least one embodiment, the text data 230 may include an entire text document or a portion of the document (e.g., characters, words, phrases, sentences, paragraphs, or sections contained within the text document). For example, at event (3) 228, the user 202 may compose an e-mail using text editor 204 that is an e-mail application. More specifically, the user 202 may interact with the e-mail application to type the following sentence: "We agree that it is usable." The typed sentence may be received by the text editor 204 as the text data 230.

At event (4) 232, the adversarial text program 110a, 110b may implement the scoring module 208 to begin operating on the text data 230 received in the text editor 204 based on the review mode selection. In this example, since automatic sentence-level interaction was selected by the user 202, the period at the end of the sentence ("We agree that it is usable.") may trigger the scoring module 208 to perform text robustness scoring on the text data 230.

According to one embodiment, "text robustness" may refer to the ability of text data 230 to withstand automated analysis using AI for NLP tasks, such as, text classification. In one embodiment, a "text robustness score" for a portion of text data 230 may be determined by calculating how much modifying (e.g., deleting) that portion of text data 230 would alter a confidence score of a prediction made by a target machine learning (ML) model before and after the modification.

According to one embodiment, at event (5) 234, the scoring module 208 may utilize the library module 206 to score portions text data 230, as further described below. In the disclosed embodiments, the library module 206 may store one or more machine learning (ML) models 236. The ML models 236 stored in the library module 206 may be associated with NLP tasks, such as, for example, classification, summarization, named-entity recognition, machine translation, and question answering. In one embodiment, the ML models 236 may be represented by a function F(x)=y, where a given ML model 236 (F) may map an input x to an output or prediction y with a specific confidence score.

In the disclosed embodiments, the library module 206 may also store one or more adversarial text attacks 238. According to one embodiment, the goal of adversarial text attacks 238 may be to take advantage of weaknesses in a given ML model 236 and apply a minimum modification to the input x to decrease the specific confidence score associated with the original output or prediction y, so as to fool the ML model 236. In some embodiments, the modifications to the input x implemented by the adversarial text attacks 238 may cause the ML model 236 to produce a completely incorrect output or prediction relative to the original y.

According to one embodiment, text data 230 may be considered to have a high text robustness score (e.g., low vulnerability score) if an output or prediction of a ML model 236 receiving the text data 230 as input, does not produce a high confidence score. Additionally, text data 230 may be considered to have a high text robustness score if no minimum modification can be made to the text data 230 which can significantly impact (e.g., decrease) the output or prediction of the ML model 236 receiving the minimally modified text data 230.

According to one embodiment, text data 230 may be considered to have a low text robustness score (e.g., high vulnerability score) if an output or prediction of a ML model 236 receiving the text data 230 as input, produces a high confidence score, and a minimum modification can be made to the text data 230 (e.g., replacing one word) to significantly impact (e.g., decrease) the output or prediction of the ML model 236 receiving the minimally modified text data 230.

According to one embodiment, the adversarial text attacks 238 may fall under one or more of the following attack types: character-level attack, word-level attack, and phrase (or sentence)-level attack. The attack type may determine the type of modification the adversarial text attack 238 may apply to text data 230. In one embodiment, the scoring module 208 may implement the respective scoring functions of the various adversarial text attacks 238 to calculate the robustness/vulnerabilities of the text data 230 at a character level, word level, and phrase or sentence level.

According to one embodiment, in order to determine the text robustness/vulnerability score, the scoring module 208 may first determine an importance score associated with each portion of the text data 230. In one embodiment, the importance score of a portion of text data 230 may be associated with the contribution or impact of that portion of the text data 230 to the outcome or prediction of a target model (e.g., ML model 236) receiving that text data 230 as input.

In at least one embodiment, the importance score may be calculated at the character level, word level, and phrase or sentence level, based on the adversarial text attack 238 that is used for the scoring function. According to one embodiment, the scoring module 208 may utilize multiple adversarial text attacks 238 to score portions of the text data 230 and return a unified importance score for the text data 230 (e.g., calculating a weighted average). In one embodiment, the scoring module 208 may apply a greater/lesser weight to adversarial text attacks 238 based on the strength of the attack and the frequency of use. For example, adversarial text attacks 238 based on projected gradient descent (PGD) may be applied greater weight because these attacks are highly effective and frequently used. In various embodiments, the adversarial text program 110a, 110b provide an equal weight to all of the adversarial text attacks 238 by default and may enable the user 202 to customize the weights for each adversarial text attack 238.

Continuing with the example in FIG. 2, the scoring module 208 may select (e.g., at event 5 (234)) a classifier F as the target ML model 236 (e.g., may be selected by user 202). Given the text data 230 ("We agree that it is usable") as input, the classifier F may predict an output label P with a confidence score of 0.9 (e.g., 90% probability that the input sentence is output label P). Then, in order to determine whether the text data 230 is textually robust, the scoring module 208 may calculate if the original prediction of the classifier F may be significantly changed by a small modification to the text data 230. In one example, the scoring module 208 may implement a word-level attack to determine the importance of each word within the text data 230. In one embodiment, the importance of a specific word within a sentence (e.g., text data 230) may be measured by calculating a difference between the outputs of classifier F, receiving inputs with and without the specific word, as follows:

Score("We")=F("We agree that it is usable")−F("agree that it is usable")

Score("agree")=F("We agree that it is usable")−F("We that it is usable")

Score("that")=F("We agree that it is usable")−F("We agree it is usable")

Score("it")=F("We agree that it is usable")−F("We agree that is usable")

Score("is")=F("We agree that it is usable")−F("We agree that it usable")

Score("usable")=F("We agree that it is usable")−F("We agree that it is")

By comparing the above scores, the scoring module 208 may determine the portion (e.g., word) of the text data 230 which had the highest impact (e.g., highest importance score) on the prediction of the classifier F. In this example, the scoring module 208 may determine that the word "agree" had the highest important score and greatest impact on the confidence score associated with the output label P predicted by the classifier F. Further, because the word "agree" had the highest importance score, the scoring module 208 may determine that modifying this portion of the sentence (e.g., text data 230) may significantly change the confidence score associated with the prediction of the classifier F.

In one embodiment, the scoring module 208 may designate the word "agree" as the least textually robust/most vulnerable portion of the sentence (e.g., text data 230): "We agree that it is usable." In some embodiments, the scoring module 208 may determine that the text data 230 ("We agree that it is usable") includes a low text robustness score, made vulnerable by the word "agree" in the sentence.

Continuing with FIG. 2, at event 6 (240), the scoring module 208 may generate a vulnerability prompt 242 in the text editor 204 to indicate the vulnerability issues (e.g., low vulnerability score) identified in the text data 230. For example, as shown in FIG. 2, the scoring module 208 may generate a vulnerability prompt 242 in the e-mail application (e.g., text editor 204) to indicate that: "This sentence is vulnerable by the word 'agree'." In some embodiments, at event 5 (240), the scoring module 208 may indicate multiple vulnerability issues associated with the text data 230. In some embodiments, the scoring module 208 may indicate multiple vulnerability issues in a ranking based on the impact of the vulnerability on the robustness of the text data 230.

According to one embodiment, at event 6 (240), the scoring module 208 may also transmit the importance scores and vulnerability issues associated text data 230 to the suggestion module 210 (e.g., concurrently with generating the vulnerability prompt 242 in the text editor 204). In one embodiment, the suggestion module 210 may include multiple strategies to modify one or more portions of the text data 230 to make the text data 230 more textually robust. The modification strategies implemented by the suggestion module 210 may be based on the adversarial text attacks 238 stored in the library module 206 and may include, for example, deletion, insertion, and replacement of characters/letters, words, and/or phrases/sentences. In some embodiments, the suggestion module 210 may implement any combination of these modification strategies.

According to one embodiment, the modification strategies of the suggestion module 210 may be constrained by three factors: the modifications must be minimal, the modifications must maintain semantic equivalency with the portion of the text data 230 that is being modified, and the modifications must make the text data 230 more textually robust. In at least one embodiment, the suggestion module 210 may identify the portion of the text data 230 for modification. Then, the suggestion module 210 may generate one or more potential modifications for that portion of the text data 230 using the adversarial text attacks 238 stored in the library module 206. Thereafter, at event 7 (244), the suggestion module 210 may test the modifications using the scoring module 208. More specifically, each modification may be applied to the text data 230 and fed into the target ML model 236 to determine if the new confidence score associated with the prediction is less than the original confidence score associated with the prediction (e.g., based on the original text data 230).

Continuing with the previous example, the suggestion module 210 may implement a word replacement strategy to modify the vulnerable portion of the text data 230. In one embodiment, the suggestion module 210 may use a word embeddings process 246 to search for a nearest neighbor in the embedding space of the identified vulnerable word "agree." In one embodiment, the word embeddings process 246 may map the word "agree" to its numerical representation (or vector), where words that have the same meaning or are close in meaning may have similar numerical representations in the embeddings space. In the illustrated example, the word embeddings process 246 applied to the word "agree" may generate three replacement words 248 ("approve"; "accept"; "think") which are semantically equivalent.

Continuing with the previous example, at event 7 (244), the suggestion module 210 may pass the words "approve," "accept," and "think" back to the scoring module 208 for robustness scoring. In one embodiment, the scoring module 208 may substitute the vulnerable word "agree" (e.g., the word with the highest importance score in the text data 230) with each of the replacement words 248 and evaluate the performance of the target model (e.g., classifier F) based on the substitution in the text data 230, as shown below:

F("we agree that it is usable")=output label P; confidence score: 0.9 [original text]

F("we approve that it is usable")=output label P; confidence score: 0.6

F("we accept that it is usable")=output label P; confidence score: 0.5

F("we think that it is usable")=output label P; confidence score: 0.3

According to one embodiment, the suggestion module 210 may rank the potential modifications to the text data 230 based on efficiency to identify the smallest modification having the most significant impact on the output of a target model (e.g., ML model 236). Based on the calculations above, the suggestion module 210 may determine that replacing the word "agree" with "think" would have the most significant impact on the output of the target model (e.g., decreasing the confidence score from 0.9 to 0.3), followed by the words "accept" and "approve." The suggestion module 210 may rank the replacement words 248 based on the amount of decrease between the original confidence score (e.g., first confidence score) and the respective confidence scores (e.g., respective second confidence scores) produced by each replacement word 248.

According to one embodiment, the suggestion module 210 may include a personalization component 250 to support the modification ranking strategies. Since text editors 204 (e.g., e-mail application) are typically used by users 202 on their personal computing devices, the personalization component 250 may learn the writing styles of the users 202 so that potential suggestions or modifications to the text data 230 may be ranked to follow individual writing styles of the users 202.

According to one embodiment, at event 8 (252), the suggestion module 210 may generate a prompt (e.g., suggestion prompt 254) in the text editor 204 to suggest modifying the identified vulnerable portion of the text data 230. In one embodiment, the suggestion prompt 254 may indicate the ranking of the modifications based on which modification would generate the most textually robust version of the text data 230. In one embodiment, the ranking order may be indicated by numbers, symbols, words, or any other descriptors. In the illustrated example, the suggestion prompt 254 may prompt the user 202 to replace the word "agree" with: "think" (best), "accept" (good), or "approve" (quite good), where the ranking order may be indicated using words (e.g., best, good, quite good). In one embodiment, the suggestion prompt 254 may enable the user 202 to approve/reject one or more of the recommended modifications to the text data 230. Thereafter, at event 9 (256), the user 202 my interact with the text editor 204 and select the word "accept" to replace the word "agree" in the text data 230. In response, the text editor 204 may modify the vulnerable portion of the text data 230 with the user approved semantically equivalent text to generate an adversarial text version 258 (e.g., including adversarial patch 260) of the original text data 230. It is contemplated that the adversarial text version 258 may include a higher text robustness score relative to the original text data 230 so as to prevent or obstruct malicious users from applying automated text analytics to text composed by user 202.

Figure 3:
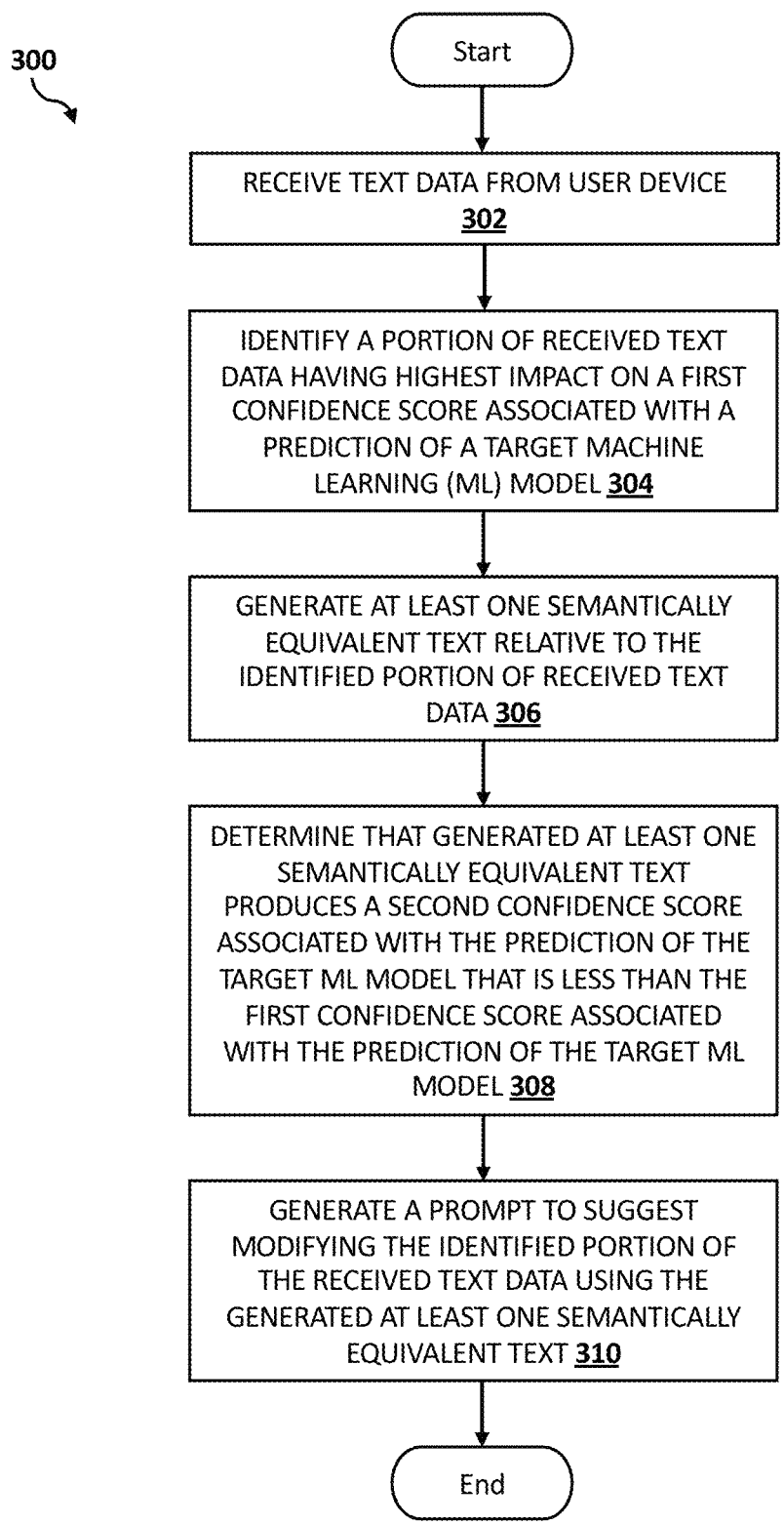
FIG. 3 is an operational flowchart illustrating an adversarial text process according to at least one embodiment.

Referring now to FIG. 3, an operational flowchart illustrating the exemplary adversarial text process 300 used by the adversarial text program 110a, 110b according to at least one embodiment is depicted.

At 302, a text data is received in a text editor from a user device. According to one embodiment, the adversarial text program 110a, 110b may be integrated into the text editor such that text data inputs received in the text editor (e.g., as a user is typing) may be processed by the adversarial text program 110a, 110b. In one embodiment, the adversarial text program 110a, 110b may enable reviewing the text data in an automatic mode, a manual mode, and a tracking mode, as described previously with reference to FIG. 2.

Then at 304, a portion of the text data having a highest impact on a first confidence score associated with a prediction of a target ML model is identified. According to one embodiment, in order to identify vulnerabilities in the text data, the adversarial text program 110a, 110b may first identify the portions of the text data that are most important to the output of the target ML model (e.g., classifier). According to one embodiment, the adversarial text program 110a, 110b may calculate an importance score for some or all portions of the text data. The important score may be calculated at a character level, a word level, and a phrase or sentence level, based on the adversarial text attack that is used for the scoring function, as described previously with reference to FIG. 2. In one embodiment, the importance of a specific text portion within a text data may be measured by calculating a difference between the outputs of a target ML model (e.g., classifier), before and after removing the specific text portion from the text data. In one embodiment, the adversarial text program 110a, 110b may designate the portion of text data having the highest importance score as the most vulnerable portion of the text data because modifying that portion of the text data may significantly change the confidence score associated with the prediction of the target ML model, as described previously with reference to FIG. 2.

Next at 306, at least one semantically equivalent text relative to the identified portion of the received text data is generated. According to one embodiment, the adversarial text program 110a, 110b may generate modifications which seek to maintain the semantic meaning of the original text data. In one embodiment, the adversarial text program 110a, 110b may identify semantically equivalent replacement words in the embedding space of an identified vulnerable word. In other embodiments, the adversarial text program 110a, 110b may use knowledge graphs to identify semantically equivalent words to replace a vulnerable word (e.g., adjacent nodes in a knowledge graph).

Then at 308, the generated at least one semantically equivalent text is determined to produce a second confidence score associated with the prediction of the target ML model that is less than the first confidence score associated with the prediction of the target ML model. According to one embodiment, the adversarial text program 110a, 110b may test each potential modification (e.g., the generated at least one semantically equivalent text) by applying the modification to the text data and feeding the modified text data into the target ML model to determine if the new confidence score (e.g., second confidence score) associated with the prediction is less than the original confidence score (e.g., first confidence score) associated with the prediction based on the original text data. Based on the lower second confidence score associated with the generated at least one semantically equivalent text, the adversarial text program 110a, 110b may determine that the robustness of the text data may be increased by modifying the text data with the generated at least one semantically equivalent text.

Thereafter at 310, a prompt is generated in the text editor to suggest modifying the identified portion of the received text data using the generated at least one semantically equivalent text. According to one embodiment, the adversarial text program 110a, 110b may generate a suggestion prompt in the text editor to recommend modifying the vulnerable text portion identified in the text data. In one embodiment, the adversarial text program 110a, 110b may enable the suggestion prompt to indicate a ranking of the recommended modification based on which modification would generate the most textually robust version (e.g., adversarial text version) of the original text data. In one embodiment, the adversarial text program 110a, 110b may indicate a ranking order using numbers, symbols (e.g., rating stars), words (e.g., best, good, quite good), or any other descriptors. In one embodiment, the adversarial text program 110a, 110b may enable the suggestion prompt to be selectable by the user for approving/rejecting one or more of the recommended modifications to the text data.

In response to receiving a user selection (e.g., affirmative selection) for one of the recommended modifications, the text editor may modify the vulnerable portion of the text data accordingly. In one embodiment, the modifications made to the vulnerable portions of the original text data may generate an adversarial text version of the original text data. In one embodiment, the modifications may function as adversarial patches to enhance the text robustness of the original text data.

The adversarial text program 110a, 110b may improve the functionality of a computer because the adversarial text program 110a, 110b may enable a text editor running on the computer to increase a text document's protection against automated AI analysis. The adversarial text program 110a, 110b may enable real-time identification of vulnerable text portions as text data is entered into a text editor. The adversarial text program 110a, 110b may generate robust portions of text that are semantically equivalent to the vulnerable text portions. The adversarial text program 110a, 110b may provide full control to the authors of the document (e.g., via the text editor) to decide which semantically equivalent text portion may be used as a replacement while the document is being written, which provides the advantage of guaranteeing that the semantic meaning of the original document is preserved.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
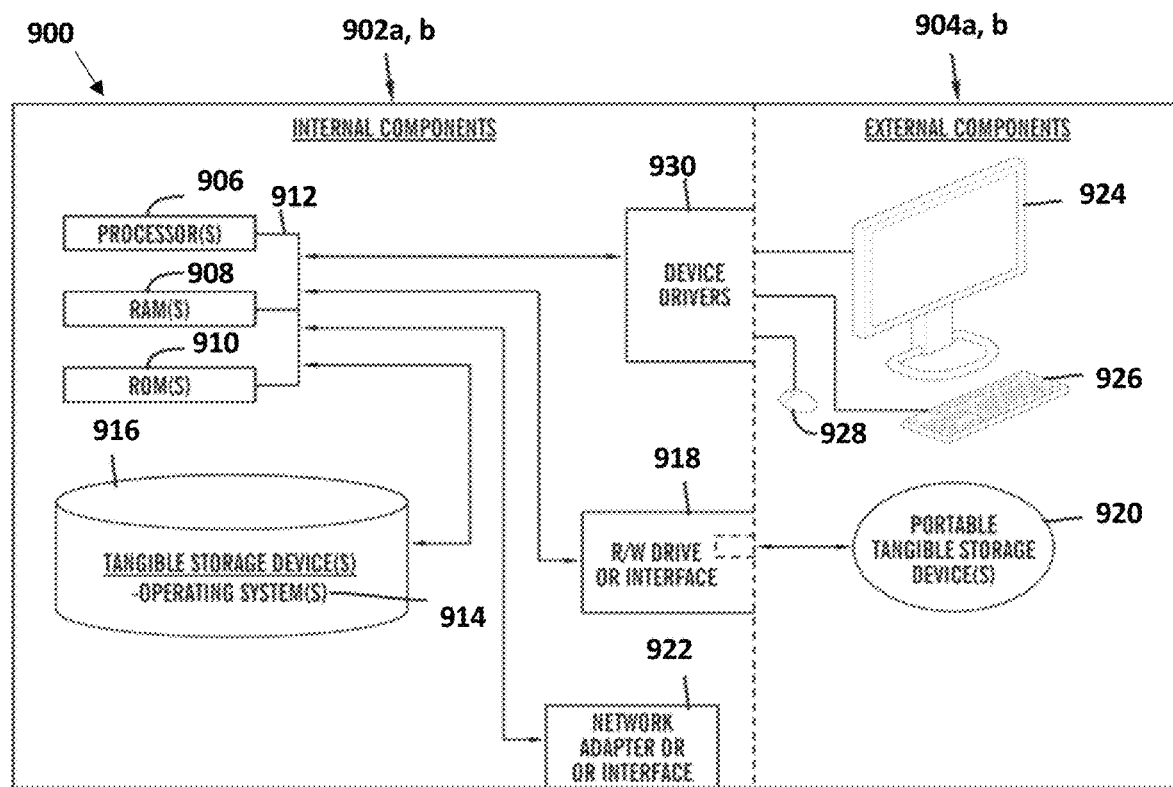
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the adversarial text program 110a in client computer 102, and the adversarial text program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the adversarial text program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the adversarial text program 110a in client computer 102 and the adversarial text program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the adversarial text program 110a in client computer 102 and the adversarial text program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
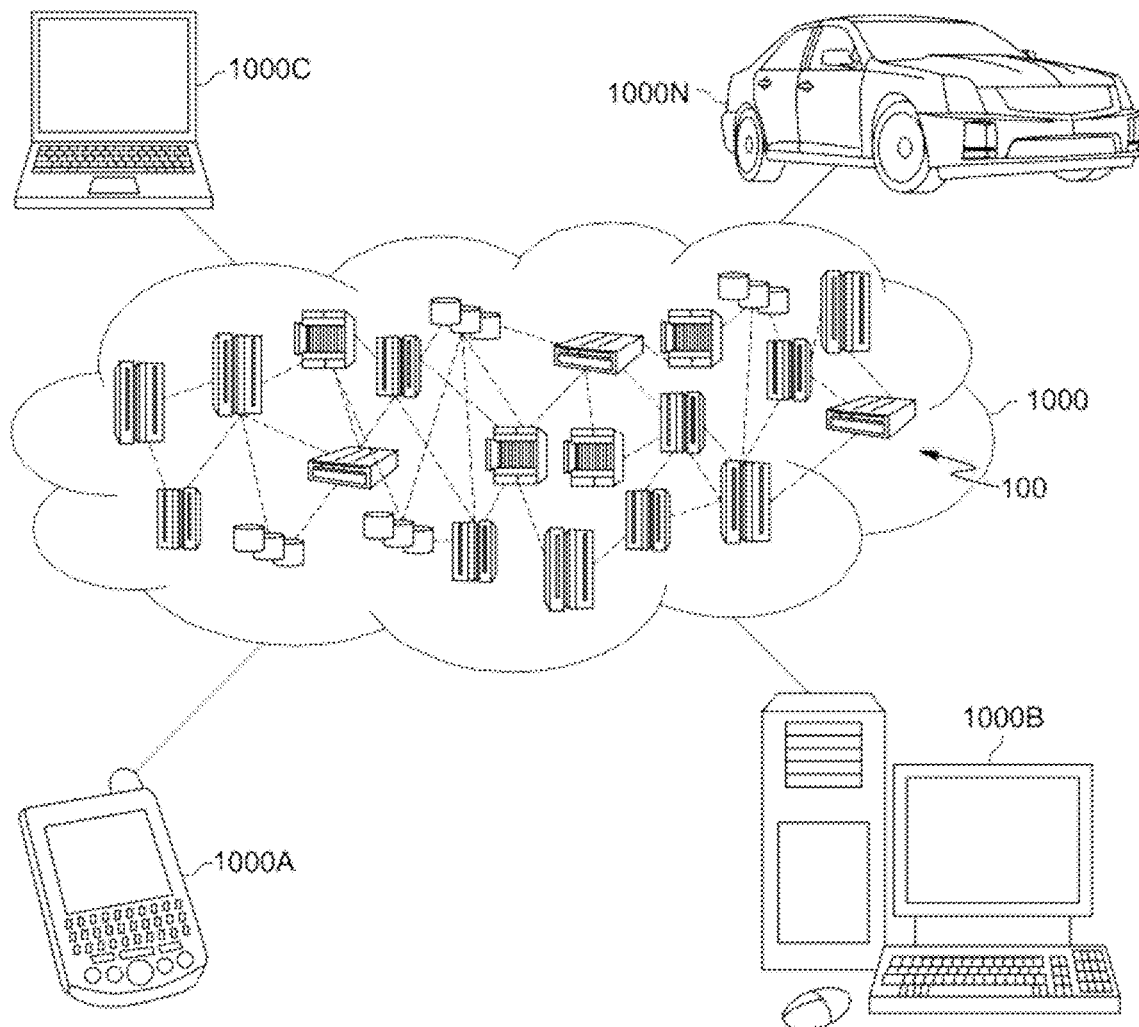
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
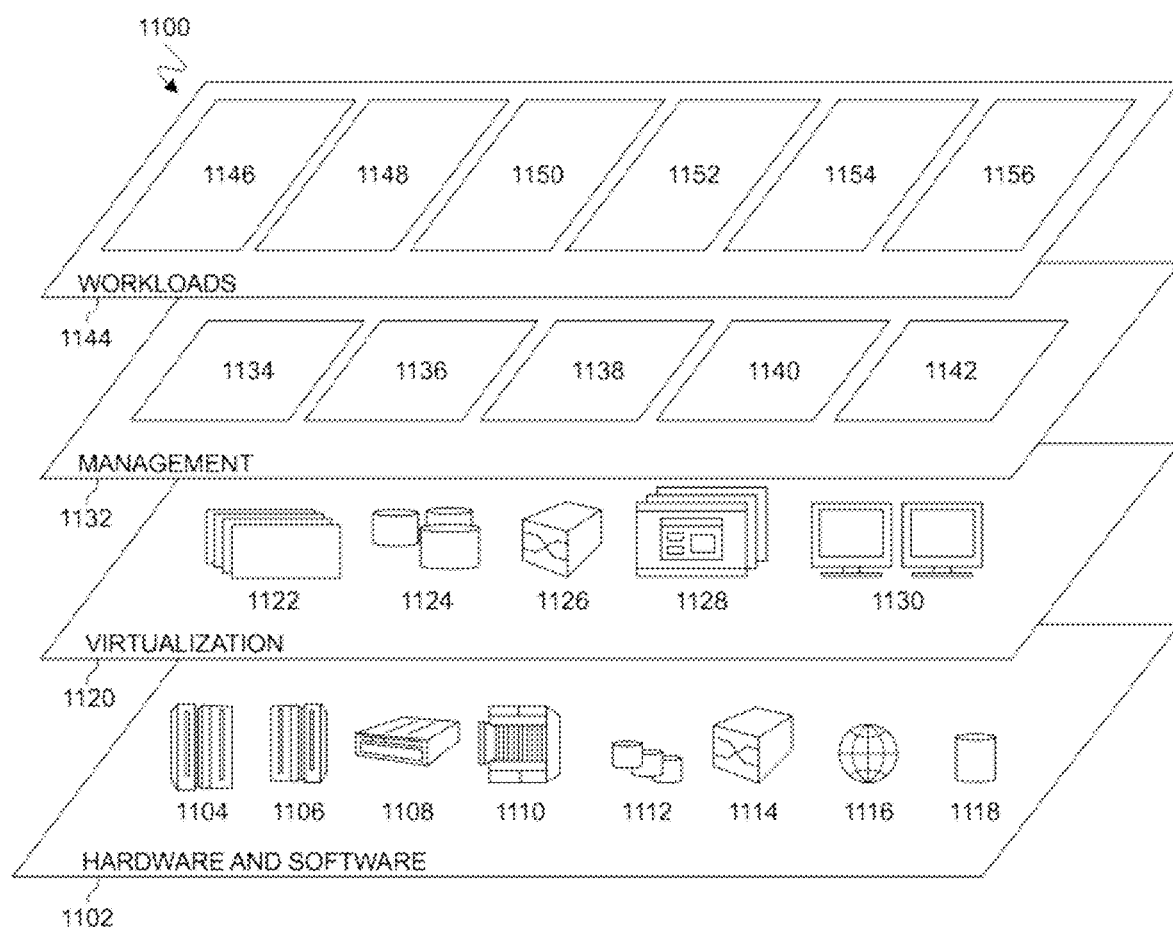
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and adversarial text processing 1156. An adversarial text program 110a, 110b provides a way to create, apply, and evaluate adversarial patches for text documents to provide protection against automated analysis of these documents using AI.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, in a text editor, a text data from a user device;
applying an adversarial text attack on the received text data;
in response to the applied adversarial text attack on the received text data, identifying a portion of the received text data having a highest impact on a first confidence score associated with a prediction of a target machine learning (ML) model;
generating at least one semantically equivalent text relative to the identified portion of the received text data;
determining that the generated at least one semantically equivalent text produces a second confidence score associated with the prediction of the target ML model that is less than the first confidence score associated with the prediction of the target ML model; and
generating, in the text editor, a prompt to suggest modifying the identified portion of the received text data using the generated at least one semantically equivalent text.

2. The method of claim 1, further comprising:
receiving, from the user device, an affirmative selection associated with the generated prompt to modify the identified portion of the received text data, wherein the received affirmative selection indicates a specific semantically equivalent text from the generated at least one semantically equivalent text; and
modifying, in the text editor, the identified portion of the received text data with the specific semantically equivalent text to generate an adversarial text version of the received text data, wherein the adversarial text version includes a higher text robustness score relative to the received text data.

3. The method of claim 1, further comprising:
generating a plurality of semantically equivalent texts relative to the identified portion of the received text data; and
ranking the generated plurality of semantically equivalent texts based on an amount of decrease between the first confidence score and a respective second confidence score produced by a respective semantically equivalent text of the generated plurality of semantically equivalent texts.

4. The method of claim 1, further comprising:
generating a plurality of semantically equivalent texts relative to the identified portion of the received text data;
replacing the identified portion of the received text data with each semantically equivalent text of the generated plurality of semantically equivalent texts; and
calculating a respective second confidence score associated with the prediction of the target ML model based on each semantically equivalent text replacing the identified portion of the received text data.

5. The method of claim 1, further comprising:
indicating, in the text editor, the identified portion of the received text data as a vulnerability of the received text data.

6. The method of claim 1, further comprising:
receiving a review mode selection from the user device, wherein the received review mode selection is selected from the group consisting of: an automatic mode, a manual mode, and a tracking mode.

7. The method of claim 1, further comprising:
receiving a review interaction level selection from the user device associated with an automatic review mode, wherein the received review interaction level selection is selected from the group consisting of: an automatic phrase-level interaction, an automatic sentence-level interaction, an automatic paragraph-level interaction, an automatic document-level interaction, an automatic randomized interaction, and an automatic attached document interaction.

8. The method of claim 1, further comprising:
operating on the received text data based on a review interaction level selection received from the user device;
in response to receiving a phrase review selection from the user device, automatically operating on a typed phrase received from the user device;
in response to receiving a sentence review selection from the user device, automatically operating on a typed sentence received from the user device;
in response to receiving a paragraph review selection from the user device, automatically operating on a typed paragraph received from the user device;
in response to receiving a randomized review selection from the user device, automatically operating on a random subset of typed text received from the user device; and
in response to receiving an attachment review selection from the user device, automatically operating on an attached document received from the user device.

9. A computer system for text data protection, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving, in a text editor, a text data from a user device;
applying an adversarial text attack on the received text data;
in response to the applied adversarial text attack on the received text data, identifying a portion of the received text data having a highest impact on a first confidence score associated with a prediction of a target machine learning (ML) model;
generating at least one semantically equivalent text relative to the identified portion of the received text data;
determining that the generated at least one semantically equivalent text produces a second confidence score associated with the prediction of the target ML model that is less than the first confidence score associated with the prediction of the target ML model; and
generating, in the text editor, a prompt to suggest modifying the identified portion of the received text data using the generated at least one semantically equivalent text.

10. The computer system of claim 9, further comprising:
- receiving, from the user device, an affirmative selection associated with the generated prompt to modify the identified portion of the received text data, wherein the received affirmative selection indicates a specific semantically equivalent text from the generated at least one semantically equivalent text; and
- modifying, in the text editor, the identified portion of the received text data with the specific semantically equivalent text to generate an adversarial text version of the received text data, wherein the adversarial text version includes a higher text robustness score relative to the received text data.

11. The computer system of claim 9, further comprising:
- generating a plurality of semantically equivalent texts relative to the identified portion of the received text data; and
- ranking the generated plurality of semantically equivalent texts based on an amount of decrease between the first confidence score and a respective second confidence score produced by a respective semantically equivalent text of the generated plurality of semantically equivalent texts.

12. The computer system of claim 9, further comprising:
- generating a plurality of semantically equivalent texts relative to the identified portion of the received text data;
- replacing the identified portion of the received text data with each semantically equivalent text of the generated plurality of semantically equivalent texts; and
- calculating a respective second confidence score associated with the prediction of the target ML model based on each semantically equivalent text replacing the identified portion of the received text data.

13. The computer system of claim 9, further comprising:
- indicating, in the text editor, the identified portion of the received text data as a vulnerability of the received text data.

14. The computer system of claim 9, further comprising:
- receiving a review mode selection from the user device, wherein the received review mode selection is selected from the group consisting of: an automatic mode, a manual mode, and a tracking mode.

15. The computer system of claim 9, further comprising:
- receiving a review interaction level selection from the user device associated with an automatic review mode, wherein the received review interaction level selection is selected from the group consisting of: an automatic phrase-level interaction, an automatic sentence-level interaction, an automatic paragraph-level interaction, an automatic document-level interaction, an automatic randomized interaction, and an automatic attached document interaction.

16. A computer program product for text data protection, comprising:
- one or more computer-readable storage media and program instructions collectively stored on the one or more computer-readable storage media, the program instructions executable by a processor to cause the processor to perform a method comprising:
  - receiving, in a text editor, a text data from a user device;
  - applying an adversarial text attack on the received text data;
  - in response to the applied adversarial text attack on the received text data, identifying a portion of the received text data having a highest impact on a first confidence score associated with a prediction of a target machine learning (ML) model;
  - generating at least one semantically equivalent text relative to the identified portion of the received text data;
  - determining that the generated at least one semantically equivalent text produces a second confidence score associated with the prediction of the target ML model that is less than the first confidence score associated with the prediction of the target ML model; and
  - generating, in the text editor, a prompt to suggest modifying the identified portion of the received text data using the generated at least one semantically equivalent text.

17. The computer program product of claim 16, further comprising:
- receiving, from the user device, an affirmative selection associated with the generated prompt to modify the identified portion of the received text data, wherein the received affirmative selection indicates a specific semantically equivalent text from the generated at least one semantically equivalent text; and
- modifying, in the text editor, the identified portion of the received text data with the specific semantically equivalent text to generate an adversarial text version of the received text data, wherein the adversarial text version includes a higher text robustness score relative to the received text data.

18. The computer program product of claim 16, further comprising:
- generating a plurality of semantically equivalent texts relative to the identified portion of the received text data; and
- ranking the generated plurality of semantically equivalent texts based on an amount of decrease between the first confidence score and a respective second confidence score produced by a respective semantically equivalent text of the generated plurality of semantically equivalent texts.

19. The computer program product of claim 16, further comprising:
- generating a plurality of semantically equivalent texts relative to the identified portion of the received text data;
- replacing the identified portion of the received text data with each semantically equivalent text of the generated plurality of semantically equivalent texts; and
- calculating a respective second confidence score associated with the prediction of the target ML model based on each semantically equivalent text replacing the identified portion of the received text data.

20. The computer program product of claim 16, further comprising:
- indicating, in the text editor, the identified portion of the received text data as a vulnerability of the received text data.

* * * * *